United States Patent [19]

Kuriyama et al.

[11] Patent Number: 5,097,338

[45] Date of Patent: Mar. 17, 1992

[54] SCANNING TYPE IMAGE SENSOR

[75] Inventors: Hiroyuki Kuriyama, Osaka; Kaneo Watanabe, Gifu; Shigeru Noguchi, Osaka; Hiroshi Iwata, Osaka; Keiichi Sano, Osaka, all of Japan

[73] Assignee: Sanyo Electric Co., Ltd., Osaka, Japan

[21] Appl. No.: 438,087

[22] Filed: Nov. 16, 1989

[30] Foreign Application Priority Data

| Nov. 17, 1988 [JP] | Japan | 63-150254[U] |
| Nov. 18, 1988 [JP] | Japan | 63-150828[U] |
| Jan. 12, 1989 [JP] | Japan | 1-5415 |

[51] Int. Cl.⁵ ........................ H04N 3/14; H04N 5/335
[52] U.S. Cl. ........................ 358/213.15; 358/213.31
[58] Field of Search ............. 358/213.15, 213.31, 358/213.11; 250/578.1

[56] References Cited

U.S. PATENT DOCUMENTS

| 4,145,721 | 3/1979 | Beaudouin et al. | 358/213.15 |
| 4,301,477 | 11/1981 | Takemoto et al. | |
| 4,652,767 | 3/1987 | Tajiri et al. | 358/213.15 |
| 4,733,097 | 3/1988 | Iwabuchi et al. | 358/213.15 |
| 4,994,877 | 2/1991 | Ino et al. | 358/213.15 |

FOREIGN PATENT DOCUMENTS

60-35869 2/1985 Japan .
62-311592 2/1987 Japan .

Primary Examiner—Howard W. Britton
Assistant Examiner—Wendy Greening
Attorney, Agent, or Firm—Darby & Darby

[57] ABSTRACT

An image sensor includes a photodiode array having a number of photodiodes arranged in a linear line. Each of the photodiodes is connected to each of analog switches which are sequentially turned-on by a drive pulse. Each analog switch includes a parallel connection of a P-channel MOS-FET and an N-channel MOS-FET having the same gate capacitance. The drive pulse is applied to a gate of the P-channel MOS-FET through one inverter and to a gate of the N-channel MOS-FET through two inverters being connected in a cascade fashion. A delay time of the one inverter and a total delay time of the two inverters are set to be equal to each other, and therefore, the two MOS-FETs are simultaneously turned-on or -off in response to the same drive pulse. A dummy switch composed of a complementary MOS-FET circuit which acts in a completely reversed phase with respect to the analog switch is provided, and a switching noise occurring in the analog switch and a switching noise occurring in the dummy switch are canceled with each other at an output terminal.

14 Claims, 8 Drawing Sheets

PRIOR ART

FIG. 5

PRIOR ART (A) DRIVE PULSE (B) SWITHING NOISE

(A) CLOCK CK (B) RELAY PULSE (C) SIGNAL VOLTAGE AT Vo

FIG. 12

(A) CLOCK CK (B) CONTROL CTRL (C) RELAY PULSE (D) OUTPUT OF A64

(E) OUTPUT OF A1

(F) SIGNAL VOLTAGE AT Vo (G) VIDEO SIGNAL

SCANNING TYPE IMAGE SENSOR

BACKGROUND OF THE INVENTION

1. Field of the invention

The present invention relates to an image sensor. More specifically, the present invention relates to an image sensor in which a number of photosensitive elements such as photodiodes arranged in a linear line are sequentially scanned and driven by a scanning type driving circuit which is constructed by a plurality of integrated circuits.

2. Description of the prior art

Figure 1:
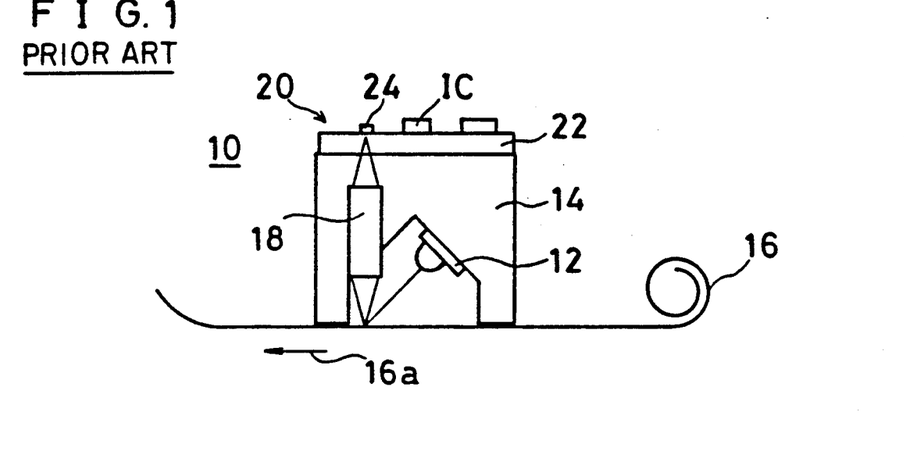
FIG. 1 is an illustrative view showing a conventional apparatus utilizing an image sensor which constitutes a background of the present invention.
Figure 2:
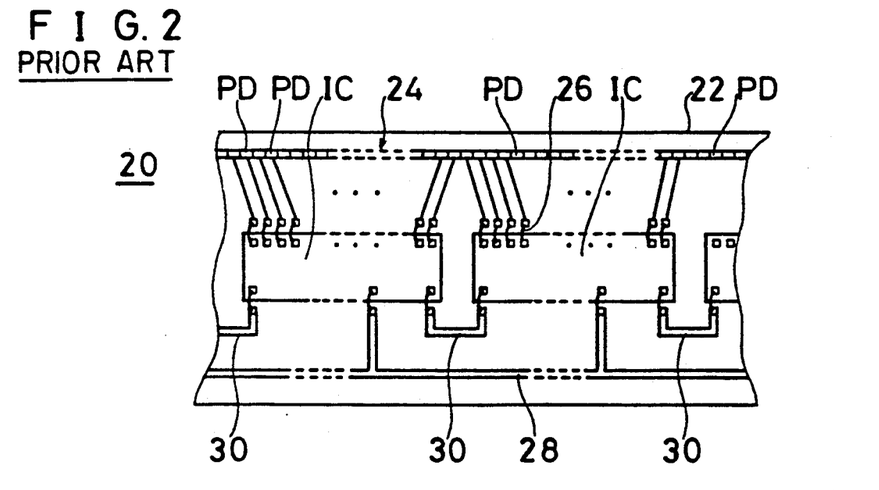
FIG. 2 is an illustrative view showing a sensor array constructed by a substrate and components mounted thereon in FIG. 1 apparatus.

An apparatus utilizing an image sensor 10 as shown in FIG. 1 is provided with an LED array 12 which is accommodated in a housing 14 and illustratively irradiates a light onto an original document 16 which is moved below the LED array 12. The light from the LED array 12 is reflected on the original 16 which is relatively moved in a direction of an arrow mark 16a. A reflected light is focused by a short-focal lens array 18, entering a sensor array 20 which is formed on a substrate 22, that is, a photodiode array 24 in which a number of photodiodes PD are arranged in a linear line as shown in FIG. 2. On the substrate 22, as well seen from FIG. 2, a plurality of integrated circuits IC which constitute a scanning type driving circuit are mounted. Although not shown, a plurality of analog switches are included in respective ones of the integrated circuits IC, which are connected to individual photodiodes PD included in the photodiode array 24 by wires 26 one by one. In the respective integrated circuits IC, signal voltages which are outputted through the respective analog switches are withdrawn to a signal line 28. Each of the respective integrated circuits IC includes a shift register (not shown) which generates a drive pulse for sequentially turning the above described analog switches on or off. Then, a relay pulse is given from a shift register included in the integrated circuit at a preceding stage to a shift register included in the integrated circuit at a succeeding stage through a relay pulse line 30.

Figure 3:
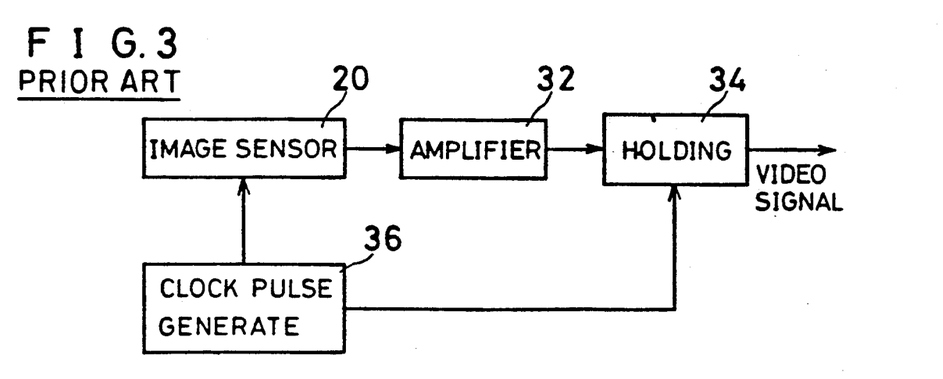
FIG. 3 is a block diagram showing a generic circuit configuration for processing a signal from FIG. 1 sensor array.

As shown in FIG. 3, an output of the sensor array 20 is given to a peak-holding circuit 34 through an amplifier 32. Therefore, a video signal a magnitude of which is dependent on an electric charge stored in each photodiode PD of the photodiode array 24 (FIG. 1 and FIG. 2) is outputted from the peak-holding circuit 34. In addition, a predetermined clock pulse is generated by a clock pulse generator 36 and the clock pulse is applied to the above described shift registers (not shown) included in the integrated circuits IC and to the peak-holding circuit 34.

The above described sensor array 20 is capable of being utilized in a facsimile, and in GIII facsimile, for example, it is required that a length of the photodiode array 24 (FIG. 2) is equal to a length of a shorter side of an A4 size, and it is required that a density of the photodiode array and a scanning rate thereof are 8 dots/mm and 10 milliseconds/line, respectively. However, an image sensor having a higher density and higher scanning rate is desired recently.

In an image sensor of a high density and a high scanning rate, an area of a light receiving portion of each photodiode PD (FIG. 2) included in the photodiode array 24 becomes small and a time for charging an electric charge in each photodiode also becomes short. Therefore, a signal outputted from such an image sensor becomes small in comparison with an image sensor of a low density and a low scanning rate. Therefore, in order to put an image sensor of a high density and a high scanning rate into practice, it is important to reduce a noise component which is superposed on a signal component.

A noise component can be roughly classified into two kinds of noise one of which is a switching noise generated in an analog switch which is incorporated in an integrated circuit and connected to a photosensitive element such as a photodiode and the other of which is a noise transferred from the shift register for sequentially driving the analog switch to a signal line.

One example of a method for reducing the former noise, that is, a switching noise of the analog switch is disclosed in, for example, Japanese Patent application Laid-open No. 35869/1985 laid-open on Feb. 23, 1985. An equivalent circuit of such an analog switch is shown in FIG. 4.

Figure 4:
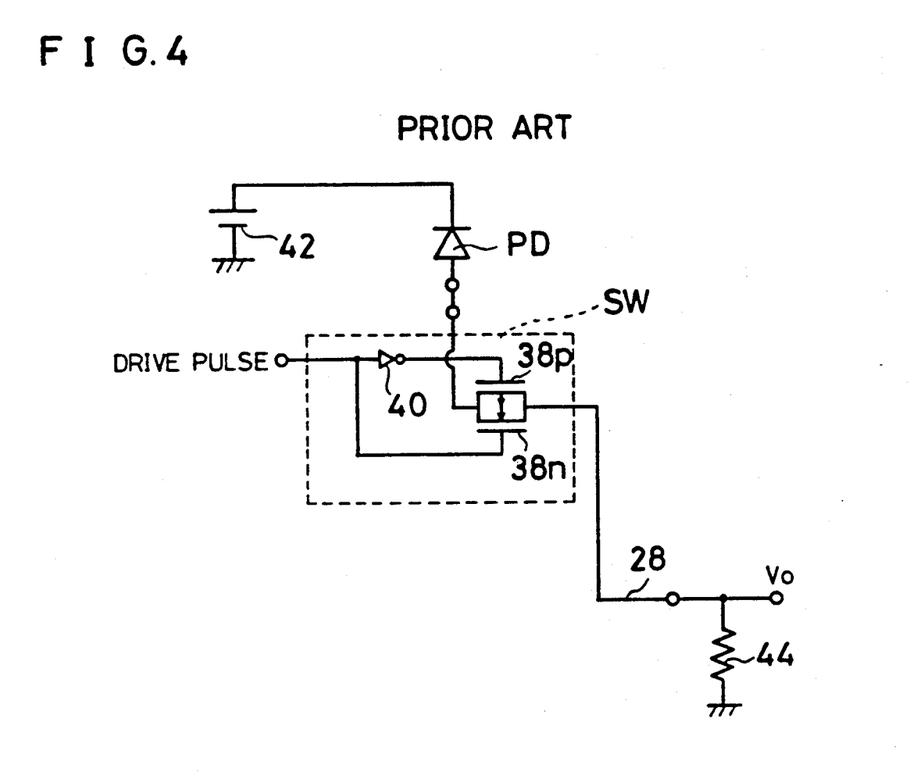
FIG. 4 is an equivalent circuit diagram showing an analog switch of a prior art.

With reference to FIG. 4, in an analog switch SW, an N-channel MOS-FET 38n and a P-channel MOS-FET 38p which have the same gate capacitance are connected in parallel with each other. Then, a drive pulse which is given from a shift register (not shown) is applied to a gate of the N-channel MOS-FET 38n as it is, and the drive pulse is applied to a gate of the P-channel MOS-FET 38p through an inverter 40. Sources of the N-channel MOS-FET 38n and P-channel MOS-FET 38p are commonly connected to an anode of a photodiode PD included in the photodiode array 24 (FIG. 2), and a bias voltage from a bias voltage source 42 is applied to a cathode of the photodiode PD. The, drains of the N-channel MOS-FET 38n and the P-channel MOS-FET 38p are commonly connected to an output terminal Vo through a signal line 28 (FIG. 2). A load resistor 44 is connected in parallel with the output terminal Vo.

In FIG. 4 prior art, when the drive pulse is applied to the analog switch SW, the N-channel MOS-FET 38n is first turned-on, and the P-channel MOS-FET 38p is turned-on after a delay time due to the inverter 40. Therefore, the analog switch SW becomes conductive at this time so that an electric charge stored in the photodiode PD can flow into the load resistor 44 through the analog switch SW. Therefore, at the output terminal Vo, a terminal voltage generated on the load resistor 44 is withdrawn as a signal voltage.

Figure 5:
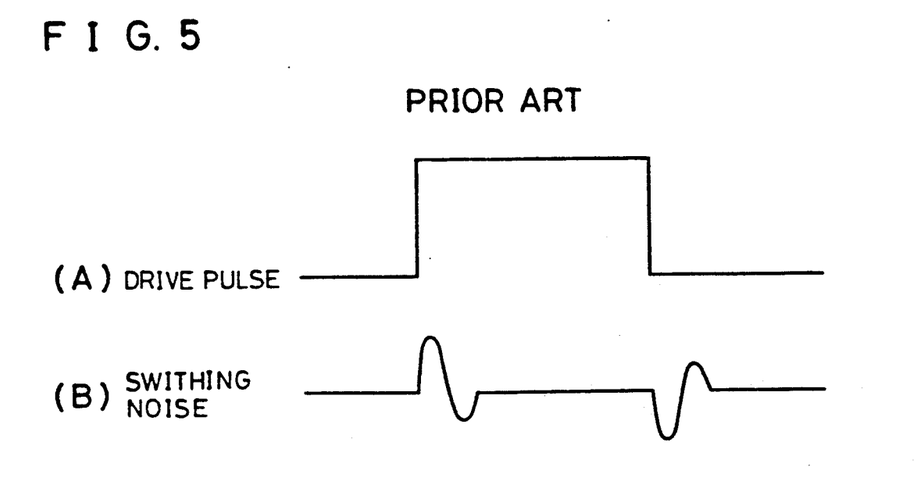
FIG. 5 is a waveform chart showing a drive pulse and a switching noise in FIG. 4 prior art.

As described above, in FIG. 4 prior art, a timing when the P-channel MOS-FET 38p is turned-on is shifted in time with respect to a timing when the N-channel MOS-FET 38n is turned on by the delay time of the inverter 40. In other words, the two MOS-FETs 38n and 38p cannot be simultaneously turned-on or -off. Therefore, if the drive pulse shown in FIG. 5 (A) is applied, a switching noise as shown in FIG. 5 (B) occurs in the analog switch SW. More specifically, although FIG. 4 prior art is intended to cancel the switching noise due to a gate-channel capacitance of a MOS-FET, such a switching noise has not been sufficiently reduced.

In addition, a method in which a positive switching noise and a negative switching noise are respectively integrated in an integration circuit and, by canceling the same, a switching noise is intended to be reduced is proposed in, for example, United State Pat. No. 4,301,477 issued on Nov. 17, 1981. However, since magnitudes of a switching noise in turning the two MOS-FETs 38n and 38p on and a switching noise in turning the same off are different from each other in FIG. 4 prior art, it is impossible to adopt a method proposed in United States Pat. No. 4,301,477 in FIG. 4 prior art. Therefore, FIG. 4 prior art is not an effective method for reducing a switching noise of an analog switch.

SUMMARY OF THE INVENTION

Therefore, a principal object of the present invention is to provide a novel image sensor.

Another object is to provide an image sensor in which a noise component can be reduced.

Another object of the present invention is to provide an image sensor having an analog switch with reduction of a switching noise.

Another object of the present invention is to provide an image sensor capable of reducing a noise component due to a drive pulse for an analog switch.

The other object of the present invention is to provide an image sensor capable of reducing a noise due to a relay pulse.

An image sensor in accordance with the present invention comprises a photosensitive element an electric characteristic of which is changeable in accordance with entering light; an analog switch which is constructed by a complementary FET circuit and connected to the photosensitive element to detect a change of the electric characteristic as a current, said complementary FET circuit including a parallel connection of a P-channel FET and an N-channel FET which have the same gate capacitance; a means for applying a drive pulse to the analog switch; one or more first inverters which receive the drive pulse and apply the same to a gate of the P-channel FET; and one or more second inverters which receive the drive pulse and apply the same to a gate of the N-channel FET, a total delay time of said second inverters being set to be equal to a total delay time of the first inverters.

In accordance with the present invention, since the P-channel FET and the N-channel FET which form the analog switch can be simultaneously turned-on or -off, the switching noise which occurs in the analog switch becomes small.

In an embodiment of the present invention, in association with the analog switch, a dummy switch which is activated in a completely reversed phase with respect to the analog switch is added. An input of the dummy switch is opened and an output thereof is connected to an output terminal as same as an output of the analog switch. In this embodiment, therefore, a switching noise of the analog switch and a switching noise of the dummy switch are canceled with each other at the output terminal, and therefore, a noise component which is superposed on a signal voltage is largely reduced.

An image sensor in accordance with the present invention comprises a number of photosensitive elements an electric characteristic of each of which is changeable in accordance with an entered light; a plurality of integrated circuit each of which takes partial charge of a plurality of the photosensitive elements; a plurality of analog switches included in respective ones of the plurality of integrated circuits, each of said analog switches being connected to a corresponding one of the photosensitive elements to detect a change of the electric characteristic thereof; a drive pulse generating means for generating a drive pulse for sequentially turning the plurality of analog switches on or off; a relay pulse applying means for applying a relay pulse from the drive pulse generating means included in the integrated circuit at a preceding stage to the drive pulse generating means included in the integrated circuit at a succeeding stage, said relay pulse having a leading edge and a trailing edge; and a time difference means for shifting in time the leading edge and the trailing edge of the relay pulse with respect to timings when the analog switch is turned-on and -off.

In accordance with the present invention, a noise component due to the relay pulse is shifted in time with respect to a signal component which is withdrawn from the analog switch. Therefore, if and when such a signal component is sampled in response to a predetermined clock, the noise component due to the relay pulse can be eliminated.

An image sensor in accordance with the present invention comprises a number of photosensitive elements an electric characteristic of each of which is changeable in accordance with entering light; a plurality of integrated circuits each of which takes partial charge of a plurality of the photosensitive elements; a plurality of analog switches included in respective one of the plurality of integrated circuits, each of which being connected to a corresponding one of the photosensitive elements to detect a change of electric characteristic thereof; a drive pulse generating means included in respective ones of the plurality of integrated circuits for generating a drive pulse for sequentially turning the plurality of analog switches on or off at a predetermined time interval; a relay pulse applying means for applying a relay pulse from the drive pulse generating means included in the integrated circuit at a preceding stage to the drive pulse generating means included in the integrated circuit at a succeeding stage, said relay pulse having a leading edge and a trailing edge; and a controlling means for controlling a time width from the leading edge to the trailing edge of the relay pulse to be sufficiently shorter than the predetermined time interval.

In accordance with the present invention, since a time width of a noise component due to the relay pulse becomes short or narrow, even if the image sensor is driven at a higher rate, a signal component is not affected by a noise component due to the relay pulse.

The objects and other objects, features, aspects and advantages of the present invention will become more apparent from the following detailed description of the embodiments of the present invention when taken in conjunction with accompanying drawings.

DETAIL DESCRIPTION OF THE PREFERRED EMBODIMENTS

Figure 6:
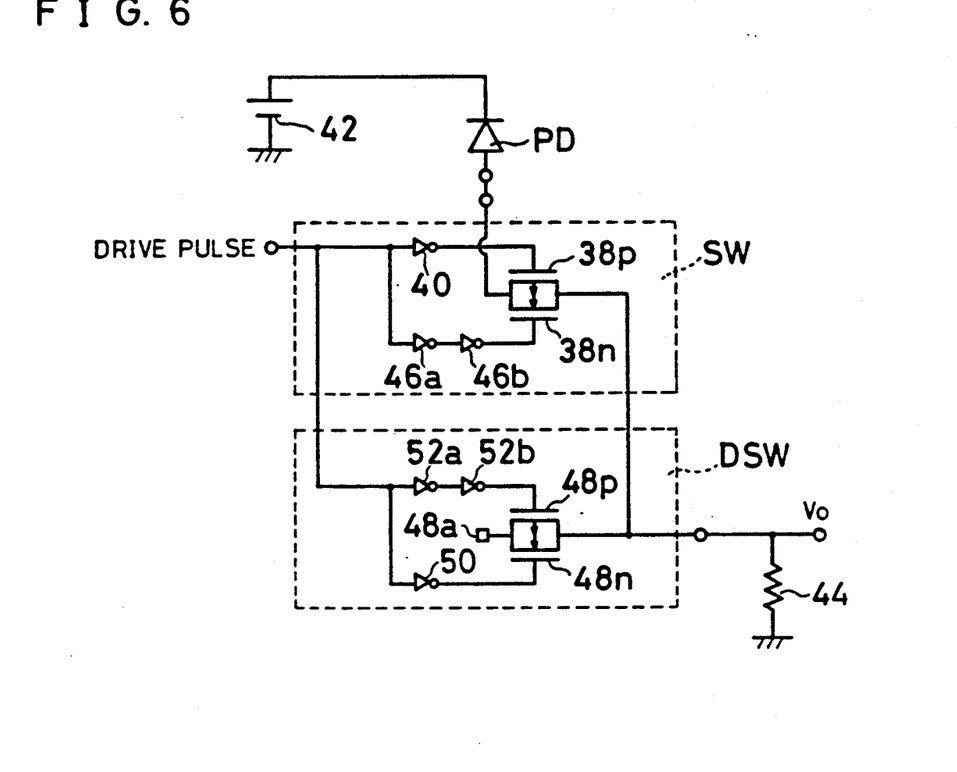
FIG. 6 is an equivalent circuit diagram showing one embodiment in accordance with the present invention.

With reference to FIG. 6, in this embodiment shown, an analog switch SW includes an N-channel MOS-FET 38n and a P-channel MOS-FET 38p which have the same gate capacitance and are connected in parallel with each other. The, sources of the two MOS-FETs 38n and 38p are, as similar to FIG. 4 prior art, connected to an anode of a photodiode PD of a photodiode array 24 (FIG. 2), and a bias voltage from a bias voltage source 42 is applied to a cathode of the photodiode PD.

Drains of the two MOS-FETs 38n and 38p are commonly connected to a load resistor 44 at an output terminal Vo. A drive pulse which is inverted by an inverter 40 is applied to a gate of the P-channel MOS-FET 38p constituting the analog switch SW. The drive pulse is also applied to a gate of the N-channel MOS-FET 38n through two inverters 46a and 46b which are connected in a cascade fashion. Each of these inverters 46a and 46b has a delay time of $\frac{1}{2}$ of a delay time of the inverter 40. Therefore, the delay time of the inverter 40 and the total delay time of the two inverters 46a and 46b becomes equal to each other.

Specifically, although not shown, each of the inverters 40, 46a and 46b is constructed by a complementary MOS-FET circuit. The ratio of channel width (W: μm)/ channel length (L: μm) of a P-channel MOS-FET (not shown) constituting the inverter 40 is illustratively designed as 25.6/3.2, and a ratio of W/L of an N-channel MOS-FET constituting the inverter 40 is designed as 12.8 /3.2. By contrast, ratios of W/L of P-channel MOS-FETs constituting the inverters 46a and 46b are respectively illustratively designed as 12.8 /3.2 and ratios of W/L of N-channel MOS-FETs constituting the inverters 46a and 46b are respectively illustratively designed as 6.4 /3.2. Therefore, the inverter 40 has a delay time of two times the delay time of each of the inverters 46a and 46b.

In FIG. 6 embodiment, a dummy switch DSW is further added. The dummy switch DSW includes an N-channel MOS-FET 48n and a P-channel MOS-FET 48p which have the same gate capacitance and are connected in parallel with each other. Sources of the two MOS-FETs 48n and 48p are commonly connected to an opened terminal 48a and drains of the same are commonly connected to the load resistor 44 and thus the output terminal Vo. The drive pulse which is inverted by an inverter 50 is applied to a gate of the N-channel MOS-FET 48n included in the dummy switch DSW. In addition, the drive pulse is applied to a gate of the P-channel MOS-FET 48p through two inverters 52a and 52b which are connected in a cascade fashion. The inverter 50 has the same delay time 10 as the above described inverter 40 and the inverters 52a and 52b have the same delay time as the above described inverters 46a and 46b, respectively. Therefore, the delay time of the inverter 50 included in the dummy switch DSW and a total delay time of the two inverters 52a and 52b becomes equal to each other.

Figure 7:
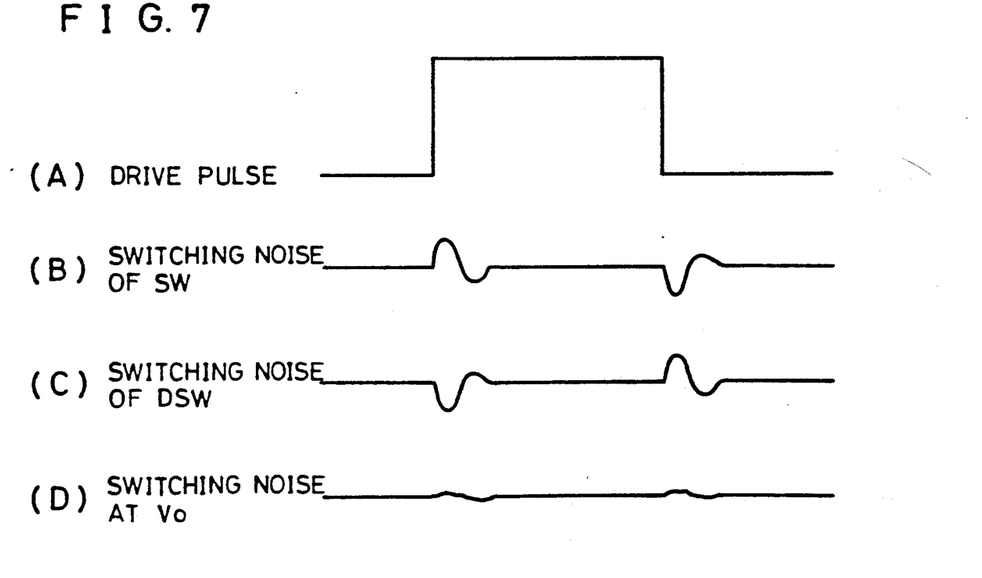
FIG. 7 is a waveform chart showing a drive pulse and switching noises in FIG. 6 embodiment.

In the FIG. 6 embodiment, when a drive pulse shown in FIG. 7 (A) is applied, the drive pulse is applied to the gate of the P-channel MOS-FET 38p of the analog switch through inversion and delay by the inverter 40, and the drive pulse is applied to the gate of the N-channel MOS-FET 38n through inversion and delay due to the inverters 46a and 46b twice. At this time, since the delay time of the inverter 40 is equal to the total delay time of the inverters 46a and 46b , the two MOS-FET 38n and 38p are simultaneously turned-on or -off. Therefore, as shown in FIG. 7 (B), only a switching noise which is reduced by approximately $\frac{1}{2}$ of a switching noise of the prior art as shown in FIG. 5 (B) occurs.

On the other hand, the dummy switch DSW is operated in a completely reversed phase with respect to the above described analog switch SW, and therefore, in the dummy switch DSW, as shown in FIG. 7 (C), a switching noise a polarity of which is opposite to that of a switching noise of the analog switch SW shown in FIG. 7 (B) and a magnitude of which is the same as that of the switching noise of the analog switch SW is generated at the same timing as the switching noise of the analog switch SW. The switching noise in the analog switch SW shown in FIG. 7 (B) and the switching noise of the dummy switch DSW shown in FIG. 7 (C) are superposed on each other at the output terminal Vo. Therefore, at the output terminal Vo, the switching noise shown in FIG. 7 (B) is canceled with the switching noise shown in FIG. 7 (C), and therefore, only a switching noise which is very small as shown in FIG. 7 (D) is superposed on a signal component. The magnitude of the switching noise shown in FIG. 7 (D) is approximately 1/10 of the switching noise shown in FIG. 5 (B). Therefore, in accordance with FIG. 6 embodiment, in comparison with FIG. 4 prior art, it becomes possible to produce a rapid operation of ten times greater than the prior art.

In FIG. 6 embodiment, one inverter 40 is provided in association with the P-channel MOS-FET 38p of the analog switch SW and two inverters 46a and 46b are provided in association with the N-channel MOS-FET 38n. However, it is needless to say that the arbitrary number of inverters may be used so that operation timings of the MOS-FETs 38n and 38p can be precisely coincident to each other. This is also applied to the dummy switch DSW.

Figure 8:
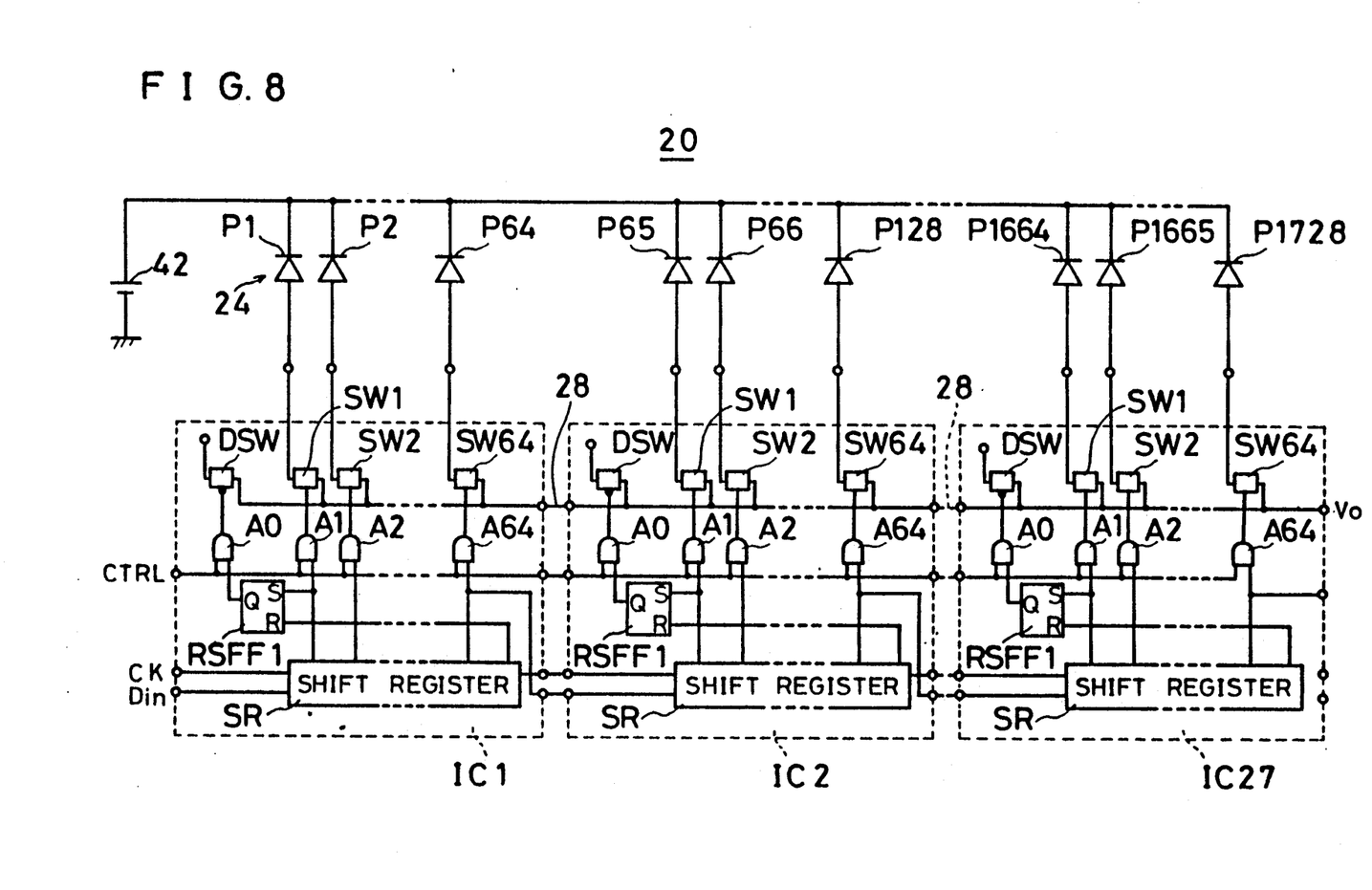
FIG. 8 is a block diagram showing a sensor array which utilizes FIG. 6 embodiment.

FIG. 8 is a block diagram showing one example of a specific sensor array to which FIG. 6 embodiment is applied. In FIG. 8 embodiment, the sensor array 20 includes a photodiode array 24 composed of one thousand and seven hundred twenty-eight (1728) photodiodes P1-P1728. Then, respective cathodes of these photodiodes P1-P1728 are commonly connected to the bias voltage source 42.

In association with the photodiodes P1-P1728 , in this embodiment shown, twenty-seven (27) integrated circuits IC1-IC27 are provided. Therefore, each of the integrated circuits IC1-IC27 controls sixty-four (64) photodiodes. In association with each of the integrated circuits IC1-IC27 ,sixty-four (64) analog switches SW1-SW64 are provided. The inputs of these analog switches SW1-SW64 are connected to anodes of the photodiodes, respectively, and respective outputs thereof are commonly connected to the output terminal Vo through the signal line 28 (FIG. 2). In each of the integrated circuits IC1-IC27, a dummy switch DSW is provided, and the dummy switch DSW is operated in a completely reversed phase with respect to the analog switches SW1-SW64 as disclosed with respect to FIG. 6 embodiment. Then, inputs of the dummy switch DSW are connected to opened terminals, respectively, and respective outputs thereof are commonly connected to the output terminal Vo.

Figure 9:
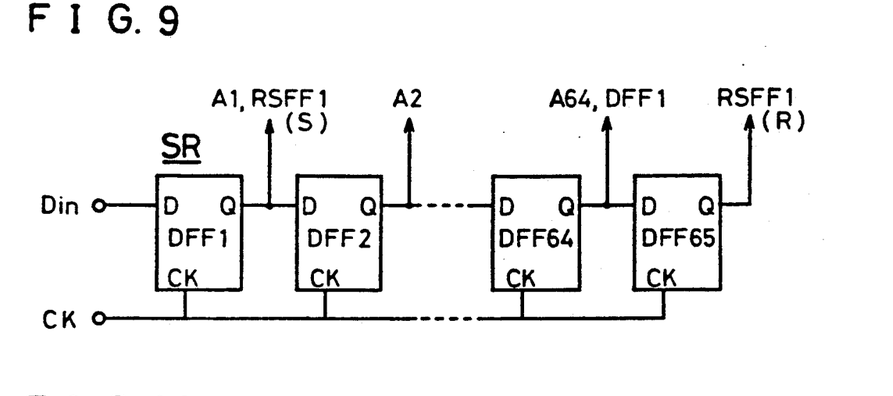
FIG. 9 is a circuit diagram showing one example of a shift register included in FIG. 8 embodiment.

Each of the integrated circuit IC1-IC27 is provided with a shift register SR. As shown in FIG. 9, the shift register SR includes sixty-five (65) D flip-flop DFF1-DFF65 which are connected in a cascade fashion. To a data input Din of a D flip-flop DFF1 at a first stage, a trigger pulse of "1" is applied, and outputs Q of the remaining D flip-flops DFF2-DFF64 are given to data inputs of succeeding D flip-flops. Outputs Q of these D flip-flops DFF1-DFF64 are applied to one inputs of corresponding AND gates A1 - A64, respectively. The output Q of the first stage D flip-flop DFF1 which constitutes the shift register SR is applied to a set input S of an RS flip-flop RSFF1, and the output Q of the last stage D flip-flop DFF65 is applied to the RS flip-flop RSFF1 as a reset input R thereof. The output Q of the D flip-flop DFF64 becomes a data input Din of a shift register included in a succeeding integrated circuit.

An output Q of the RS flip-flop RSFF1 included in respective one of the integrated circuits IC1-IC27 is applied to one input of an AND gate A0. To the other inputs of the AND gates A0-A64, a control pulse CTRL is applied. The control pulse CTRL is a reversed phase pulse with respect to the clock CK which is applied to the shift register SR. In addition, the control pulse is generated by a control pulse generating circuit (not shown).

Figure 10:
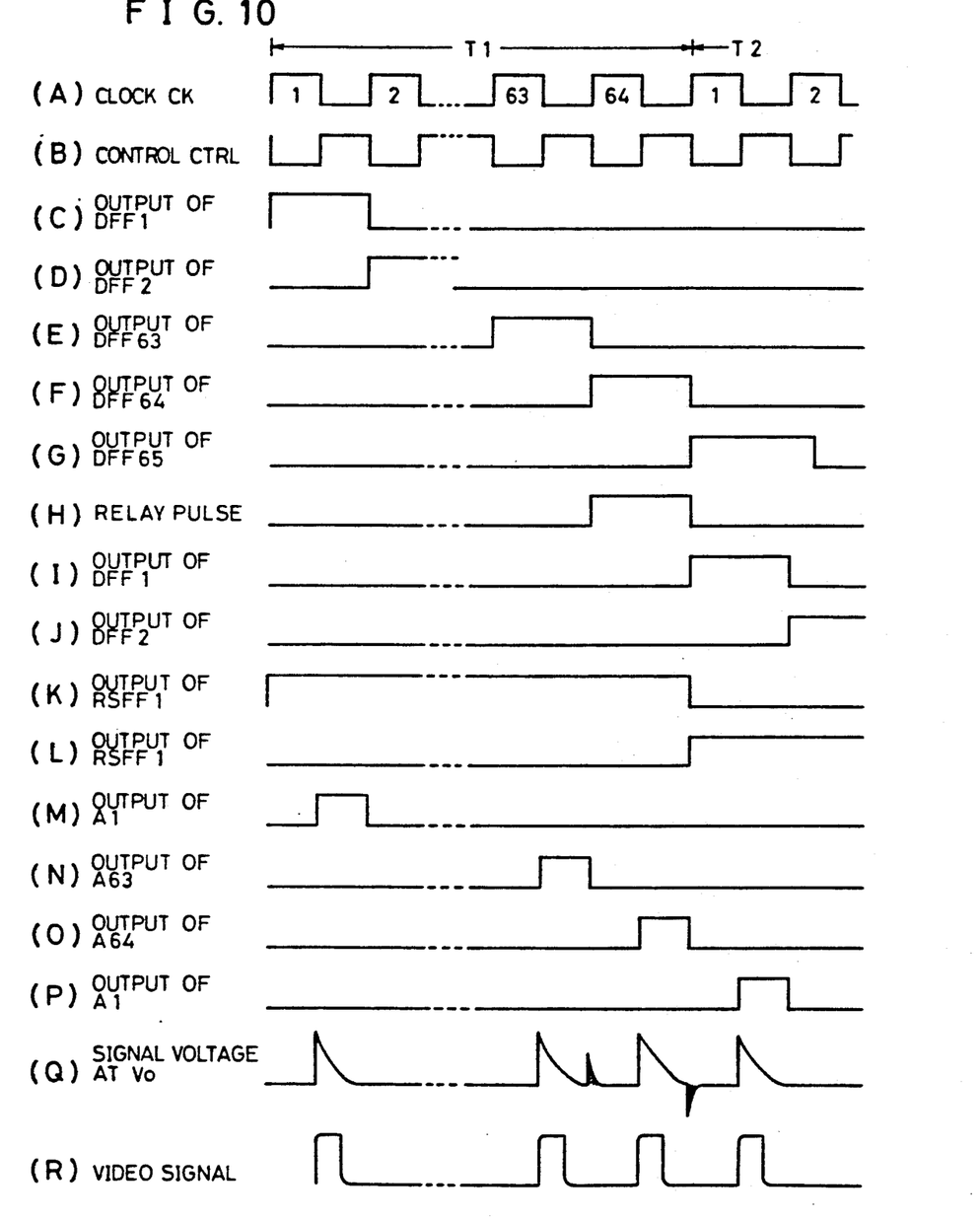
FIG. 10 is a waveform chart showing a whole action or operation of FIG. 8 embodiment.

With reference to FIG. 10, time period T1 is a time period during when an integrated circuit of a preceding stage, for example, IC1 is operated, and time period T2 is a time period during when an integrated circuit of a succeeding stage, for example, IC2 is operated.

In FIG. 8 embodiment, the clock pulse CK as shown in FIG. 10 (A) is applied to the shift registers SR included in the respective integrated circuits IC1-IC27. A trigger pulse of "1" is given to the data input Din of the shift register SR of the integrated circuit IC1 at a first stage, and the outputs of the D flip-flop DFF64 of the shift registers which are included in the integrated circuits at preceding stages are applied to the shift registers of the succeeding integrated circuits IC2-IC27 as relay pulses.

In synchronous with the clock pulse CK as shown in FIG. 10 (A), pulses as shown in FIG. 10 (C)-FIG. 10 (G), FIG. 10 (I) and FIG. 10 (J) are outputted from the D flip-flops DFF1-DFF64 which are shown in FIG. 9 and constitute the shift register SR. As shown in FIG. 8, the outputs of the D flip-flop DFF1-DFF64 are applied to the corresponding AND gates A1-A64, respectively. On the other hand, to the AND gates A1-A64, the control pulse CTRL shown in FIG. 10 (B) is applied by the control pulse generating circuit (not shown). Therefore, drive pulses as shown in FIG. 10 (M)-FIG. 10 (P) are outputted from the AND gates A1-A64. The drive pulses are applied to corresponding analog switches SW1-SW64, as shown in FIG. 6. Therefore, a signal voltage as shown in FIG. 10 (Q) is obtained at the output terminal Vo. The signal voltage at the output terminal Vo is sampled by the peak-holding circuit 34 shown in FIG. 3 for each clock pulse CK, and consequently, a video signal as shown in FIG. 10 (R) is obtained.

In addition, it will be noted that in order to simplify the drawings, a case where charged electric charges of the photodiodes P1-P1728 (FIG. 8) are the same, that is, a case where a level of the video signal is a constant is illustrated in FIG. 10.

The output of the D flip-flop DFF1 (FIG. 9) shown in FIG. 10 (C) is applied to the set input of the RS flip-flop RSFF1 and the output of the D flip-flop DFF65 (FIG. 9) shown in FIG. 10 (G) is applied to the reset input of the RS flip-flop RSFF1. Therefore, as shown in FIG. 10 (K) and FIG. 10 (L), the outputs of the RS flip-flops RSFF1 continuously become a high level from a leading edge of a first clock pulse shown in FIG. 10 (A) to a trailing edge of the relay pulse shown in FIG. 10 (H). The output Q of the RS flip-flop RSFF1 is inputted to the AND gate A0 together with the control pulse CTRL shown in FIG. 10 (B). Therefore, the drive pulse which repeats a low level and a high level at the same timing of the control pulse CTRL is obtained from the AND gate A0. As shown in FIG. 6, such a drive pulse is given to the dummy switch DSW. Therefore, as similar to FIG. 6 embodiment previously described, the dummy switch DSW is turned-on or -off at every timing when the analog switches SW1-SW64 are turned-off or -on. Therefore, as shown in FIG. 7 (D), switching noises of the analog switches SW1-SW64 shown in FIG. 7 (B) are canceled with switching noises of the dummy switch DSW shown in FIG. 7 (C). Therefore, it will be clearly understood that in FIG. 8 embodiment, a switching noise component which is superposed on the signal voltage being obtained at the output terminal Vo can be also largely reduced in comparison with a conventional apparatus.

In addition, in FIG. 8 embodiment, only one dummy switch DSW which is operated in common to the analog switches SW1-SW64 are provided for each of the respective integrated circuits IC1-IC27. Therefore, in accordance with FIG. 8 embodiment, increase of an occupied area for the dummy switch DSW in an integrated circuit is very little. Therefore, a cost of the integrated circuit does not increase. However, it is needless to say that as shown in FIG. 6 embodiment, one dummy switch DSW is arranged for one analog switch SW.

Figure 11:
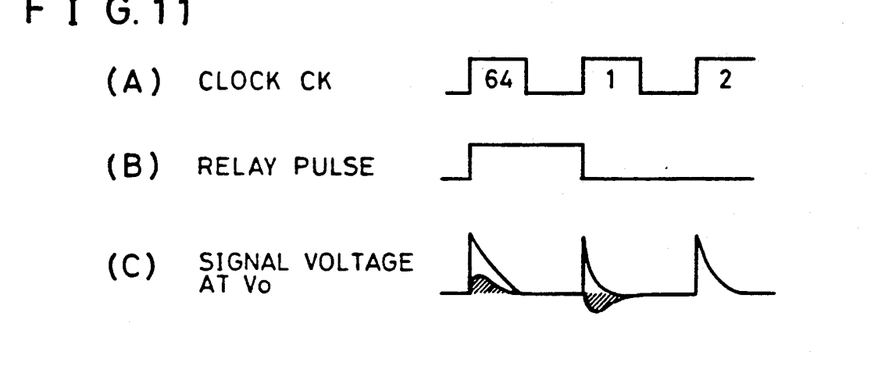
FIG. 11 is a waveform chart showing a noise component to describe an advantage of FIG. 8 embodiment in comparison with FIG. 10.

In accordance with FIG. 8 embodiment, there is a further advantage set forth in the following. More specifically, if and when in FIG. 8 embodiment, the outputs of the D flip-flops DFF1-DFF64 (FIG. 9) constituting the shift register SR are applied as they are to the analog switches SW1-SW64 as the drive pulses without using the AND gates A1-A64, noise signals as shown by the oblique hatch lines in FIG. 11 (C) are generated at timings of the leading edge and the trailing edge of the relay pulse shown in FIG. 11 (B). The noise signals as shown by the oblique lines are superposed on the signal line 28, that is, the output terminal Vo through stray capacitance (not shown) being formed in association with the signal line 28 (FIG. 2). Therefore, as shown in FIG. 11 (C), the noise signal associated with the photodiode at the last stage, for example, P64 in FIG. 8 seemingly becomes large, and that at the photodiode at the first stage which is succeeding thereto, for example, P65 in FIG. 8 seemingly becomes small. Such an apparent change of the signal voltage affects as it is a quantity of an image in a facsimile, for example, and therefore, in order to read a half-tone image such as a photograph, it is necessary to provide a correction circuit which utilizes a ROM, processing unit and so on and is complex and expensive.

In order to eliminate a noise component due to the relay pulse, in Japanese Patent application Laid-open No. 31159/1987 laid open on Feb. 10, 1987, a method in which a relay pulse leading edge and trailing edges of which are changed during respective selection pulses for last sensors and, by making integration of a signal voltage during such a selection pulse, a positive noise and a negative noise are canceled with each other was proposed. However, in such a method, a video signal of respective first bits become invalid, and if and when magnitudes of the positive noise and the negative noise are not the same, consequently, noise cancellation is not performed effectively.

By contrast, as shown in FIG. 8, if and when the outputs of the respective D flip-fops DFF1-DFF64 of the shift register SR are inputted to the AND gates A1-A64 and the AND gates A1-A64 are controlled by the control pulse CTRL which is reversed in phase with respect to the clock pulse CK, as shown in FIG. 10 (M)-FIG. 10 (P), the analog switches SW1-SW64 are turned-on or -off at a timing that is shifted with respect to the clock pulse CK by ½ of a time interval of the clock pulse CK. Therefore, in accordance with FIG. 8 embodiment, as shown by oblique hatch lines in FIG. 10 (Q), the noises being generated at the leading edge and the trailing edge of the relay pulse shown in FIG. 10 (H) become distinguishable in time from the signal voltage which is obtained from the analog switches SW1-SW64. Therefore, if and when the signal voltage as shown in FIG. 10 (Q) is given to the peak-holding circuit 34 (FIG. 3), since the peak-holding circuit 34 is performed a peak-holding operation in synchronous with the clock pulse CK, such noise component does not appear on the video signal, as shown in FIG. 10 (R). Therefore, in accordance with FIG. 8 embodiment, a problem that the noise components due to the relay pulse are superposed on the video signal can be also solved effectively.

In addition, in FIG. 8 embodiment, the analog switches SW1-SW64 are turned-on or -off by the control pulse CTRL which is shifted by ½ phase with respect to the clock pulse CK. Therefore, it is possible to reduce over-shooting noises which are generated in synchronism with a leading edge and a trailing edge of the clock pulse CK in a spike form. Therefore, in this case, it is not necessary to use additional components such as a low-pass filter for eliminating the over-shooting noise, and therefore, there is an advantage that it is possible to simplify a processing circuit for processing a video signal.

In addition, a shifted amount between the clock pulse CK and the timing when the analog switches SW1-SW64 are turned-on or -off may be suitably and arbitrarily selected and designed.

Figure 12:
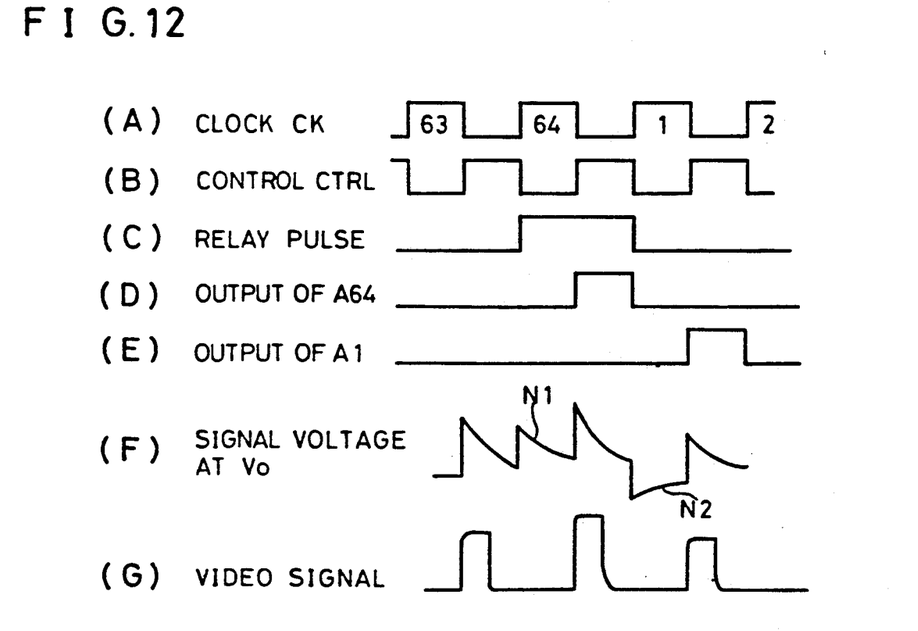
FIG. 12 is a waveform chart showing a noise component to describe a problem in FIG. 8 to be solved.

In addition, in FIG. 8 embodiment, as a relay pulse, the outputs of the D flip-flop DFF64 which constitutes the shift register SR are utilized. Therefore, when the sensor array 20 is rapidly scanned, a cross-talk noise is, in some cases, generated on the signal line 28 in the vicinity of the relay pulse line 30 (FIG. 2). More specifically, as shown by reference characters N1 and N2 in FIG. 12 (F), cross-talk noises are generated at a leading edge and a trailing edge of the relay pulse shown in FIG. 12 (C), and therefore, a video signal being outputted from the peak-holding circuit 34 (FIG. 3) is, in some cases, changed as shown in FIG. 12 (G).

On the assumption that a scanning rate (a rate for sending a video signal of one line) of the sensor array 20 is one millisecond, in order to completely form signals of the photodiodes P1-P1728 for such a time period, it is necessary to set a period of the clock pulse CK as approximately 0.5 microseconds. At this time, if a resistance value of the load resistor 44 is 1K ohms, for example, a signal voltage is outputted before the cross-talk noise has not been sufficiently decayed.

Therefore, the video signal from the peak-holding circuit 34 is affected by the cross-talk noise. In order to solve such a problem, FIG. 13 embodiment is provided.

Figure 13:
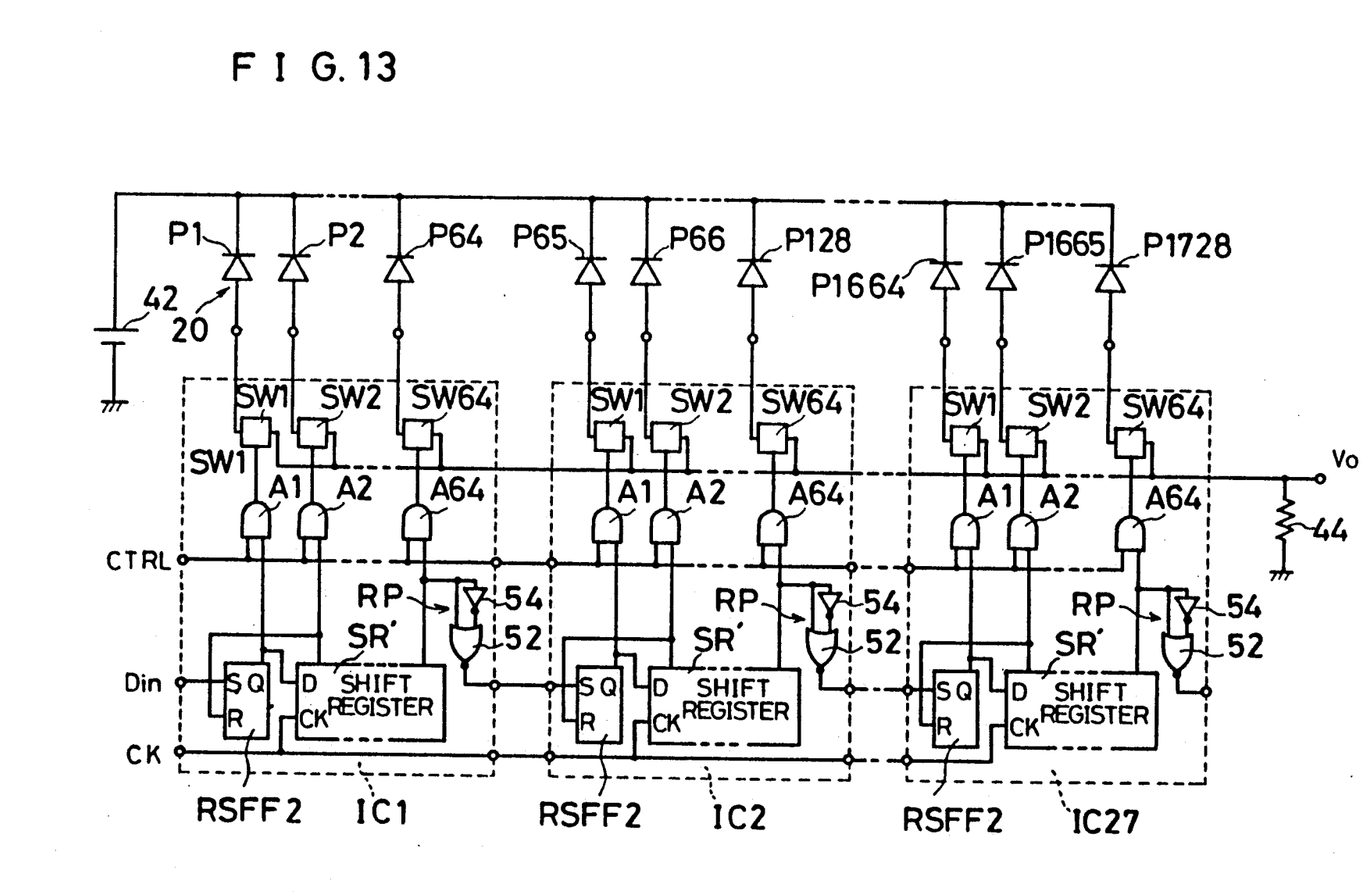
FIG. 13 is a block diagram showing a sensor array of another embodiment in accordance with the present invention.

In the FIG. 13 embodiment, in comparison with the shift register SR of FIG. 8 embodiment, a shift register SR' included in each of the integrated circuits IC1-IC27 is modified. More specifically, in FIG. 13 embodiment, the shift register SR' includes sixty-four (64) D flip-flops DFF2-DFF65, and the D flip-flop DFF1 at the first stage in FIG. 9 is substituted with an RS flip-flop RSFF2. Then, a data input Din is applied to a set input S of the RS flip-flop RSFF2 of the integrated circuit IC1 at the first stage. As set inputs of the RS flip-flops RSFF2 of the remaining integrated circuits IC2-IC27, relay pulses from the integrated circuits at the preceding stages are applied thereto. The output of the D flip-flop DFF2 shown in FIG. 9 is applied to a reset input R of the RS flip-flop RSFF2, and an output Q of the RS flip-flop RSFF2 is substituted for the output of the D flip-flop DFF1 and applied to the one input of the AND gate A1. The output of the RS flip-flop RSFF2 is also applied to the data input of the D flip-flop DFF2 shown in FIG. 9.

Furthermore, in FIG. 13 embodiment, relay pulse forming circuits RP are connected between respective outputs of the D flip-flops DFF64 (FIG. 9) and respective set inputs of the RS flip-flops RSFF2 of succeeding integrated circuits. Each of the relay pulse forming circuits RP includes a NOR gate 52 which receives the output of the D flip-flop DFF64 as it is and an inverter 54 which inverts the output of the D flip-flop DFF64 and applies the same to the other input of the NOR gate 52. Then, an output of the NOR gate 52 is applied to the set input of the RS flip-flop RSFF2 of the succeeding integrated circuit as a relay pulse.

Figure 14:
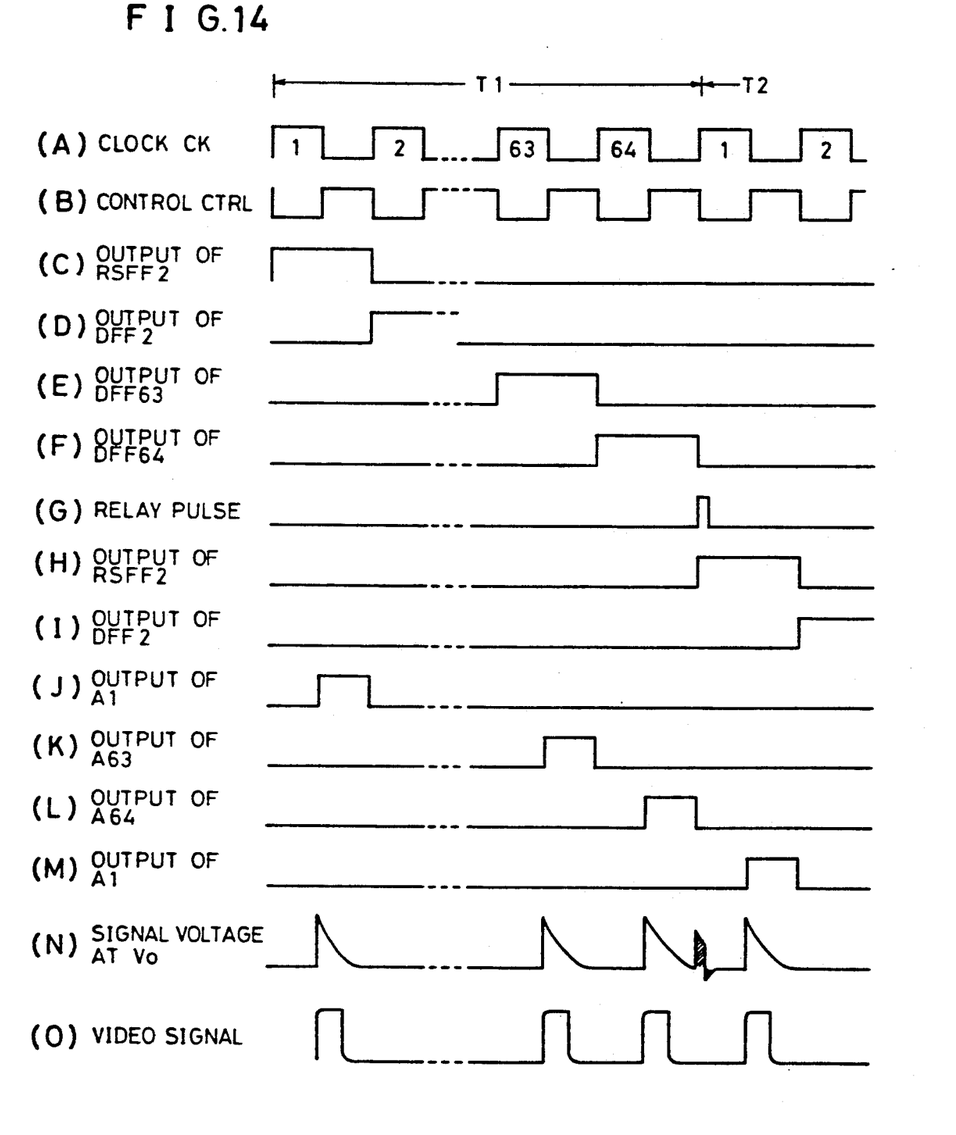
FIG. 14 is a waveform chart showing a whole action or operation of FIG. 13 embodiment.

In accordance with this embodiment, the relay pulse shown in FIG. 14 (G) is obtained from the relay pulse forming circuit RP. A time width of the relay pulse is equal to a delay time of the inverter 54 of the relay pulse forming circuit RP. That is, in this embodiment, the width of the relay pulse is set to be narrower than that of the relay pulse of FIG. 8 embodiment (FIG. 10 (H)). Therefore, at timings of a leading edge and a trailing edge of the relay pulse shown in FIG. 14 (G), noise components as shown by oblique hatch lines in FIG. 14 (N) are superposed on the output terminal Vo. However, since the time width of the relay pulse is very narrow, such noise components exert no influence to a succeeding signal voltage. Therefore, no change occurs in the video signal shown in FIG. 12 (G) because the noise components, the continuation time period of which is short, can be completely eliminated in a peak-holding process of the peak-holding circuit 34.

In addition, in a case where the scanning rate is one millisecond and a clock interval is 0.5 microseconds, a time width of the relay pulse in FIG. 13 embodiment may be set as 40 microseconds -200 microseconds, preferably 40 microseconds. A reason is that an action of the RS flip-flop RSFF2 becomes astable when the time width of the relay pulse is less than 40 microseconds and no effect can be expected when the time width is more than 200 microseconds.

In addition, a reason why the RS flip-flop RSFF2 is utilized as a flip-flop at the first stage of the shift register SR' in FIG. 13 embodiment is that since the time width of the relay pulse is narrow and the relay pulse is shifted in time with respect to the clock pulse CK, if a D flip-flop is utilized as this first stage flip-flop, "1" cannot be transferred to the D flip-flop.

In addition, although illustration of the dummy switch DSW shown in FIG. 8 embodiment and circuit components associated therewith is omitted in FIG. 13, the dummy switch DSW may be utilized in FIG. 13 embodiment. In a case where the dummy switch DSW is added to FIG. 13 embodiment, the output Q of the RS flip-flop RSFF2 will be given to the set input of the RS flip-flop RSFF1 (FIG. 8).

Furthermore, in the above described embodiments, photodiodes are utilized as photosensitive elements; however, it is needless to say that as such a photosensitive element, any elements an electric characteristic of which is changeable in accordance with entering light. In addition, as a means for generating a drive pulse, a decoder, a timing ROM or the like may be utilized other than the shift register used in the disclosed embodiments.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A scanning type image sensor, comprising:
   a photosensitive element having an electric characteristic which is changeable in accordance with entering light;
   an analog switch comprising a first complementary FET circuit connected to said photosensitive element to detect a change of said electric characteristic as a current, said first complementary FET circuit including a first parallel connection of a first P-channel FET and a first N-channel FET having substantially the same gate capacitance;
   means for applying a drive pulse to said analog switch;
   at least one first inverter means through which said drive pulse is applied to a gate of said first P-channel FET; and
   at least one second inverter means through which said drive pulse is applied to a gate of said first N-channel FET, the total delay time of said second inverter means being substantially equal to the total delay time of said first inverter means.

2. A scanning type image sensor in accordance with claim 1, further comprising a dummy switch adapted to receive the drive pulse, an input of said dummy switch being opened and an output of of said dummy switch being connected to an output terminal to which said analog switch is also connected, said dummy switch being operated in a reversed phase with respect to said analog switch.

3. A scanning type image sensor in accordance with claim 2, wherein the dummy switch includes a second complementary FET circuit, said second complementary FET circuit including a second parallel connection of a second P-channel FET and a second N-channel FET having substantially the same gate capacitance, further comprising
   means for applying a drive pulse to said dummy switch;
   at least one third invert means through which the drive pulse is applied to a gate of said second P-channel FET; and
   at least one fourth inverter means through which the drive pulse is applied to a gate of said second N-channel FET, the total delay time of said third inverter means being substantially equal to the delay time of said fourth inverter means.

4. A scanning type image sensor, comprising
   a photosensitive element having an electric characteristic which is changeable in accordance with entering light;
   an output terminal;
   an analog switch having an input connected to said photosensitive element and an output connected to said output terminal for detecting a change of said electric characteristic as a current, said analog switch being turned-on or -off by a drive pulse; and
   a dummy switch having an input which is opened and an output which is connected to said output terminal, and said dummy switch being operated in a reversed phase with respect to said analog switch.

5. A scanning type image sensor, comprising:
   a photosensitive element having an electric characteristic which is changeable in accordance with entering light;
   an analog switch comprising a first complementary FET circuit connected to said photosensitive element to detect a change of said electric characteristic as a current, said first complementary FET circuit including a first parallel connection of a first P-channel FET and a first N-channel FET having substantially the same gate capacitance;
   a dummy switch having an input which is opened and an output which is connected to an output terminal of the sensor together with an output of said analog;
   means for applying a drive pulse;
   first inverter means through which said drive pulse is applied to a gate of said first P-channel FET of said analog switch;
   second inverter means through which said drive pulse is applied to a gate of said first N-channel FET of said analog switch, the total delay time of said second inventer means being substantially equal to the total delay time of said first inverter means;
   third inverter means through which said drive pulse is applied to a gate of said second P-channel FET of said dummy switch; and
   fourth inverter means through which said drive pulse is applied to a gate of said second N-channel FET of said dummy switch, the total delay time of said third inverter means being substantially equal to the total delay time of said fourth inverter means.

6. A scanning type image sensor in accordance with claim 5, wherein there are a first plurality of photosensitive elements and a plurality of integrated circuits each controlling a group of said first plurality of photosensitive elements for, a plurality of the analog switches in each of said plurality of integrated circuits, at least one said dummy switch in each of said plurality of integrated circuits, further comprising a dummy switch controlling means for turning said at least one said dummy switch of an integrated circuit on or off in synchronism with the time when each of said plurality of the analog switches of an integrated circuit is turned-off or-on.

7. A scanning type image sensor, comprising:
a first plurality of photosensitive elements each having an electric characteristic which is changeable in accordance with entering light;
a plurality of integrated circuits connected in series each for controlling a group of said first plurality of photosensitive elements;
a plurality of analog switches included in each of said plurality of integrated circuits, an input of each of said analog switches being connected to a corresponding one of said photosensitive elements of the group of elements controlled by a said integrated circuit to detect a change of said electric characteristic thereof;
means included in each of said plurality of integrated circuits for generating a drive pulse to sequentially turn the plurality of analog switches in the said integrated circuit on or off;
means for applying a relay pulse from said drive pulse generating means of one said integrated circuit to said drive pulse generating means of a preceding integrated circuit and to said drive pulse generating means of a succeeding integrated circuit, said relay pulse having a leading edge and a trailing edge;
means for forming time differences between said leading edge of said relay pulse and a time when said analog switch is turned-on and between said trailing edge of said relay pulse and a time when said analog switch is turned-off, respectively.

8. A scanning type image sensor in accordance with claim 7, wherein the drive pulse generating means includes means for receiving a clock pulse and outputting the drive pulse for each clock pulse.

9. A scanning type image sensor in accordance with claim 8, wherein the time difference forming means includes a plurality of gate means which receive the drive pulse and are controlled by a control pulse which is shifted with respect to said clock pulse, an output of each of said gate means being applied to a corresponding one of said analog switches.

10. A scanning type image sensor in accordance with claim 9, wherein the control pulse is a reversed phase pulse of the clock pulse.

11. A scanning type image sensor in accordance with claim 7, further comprising means for controlling the time from said leading edge to said trailing edge of said relay pulse to be sufficiently shorter than a time interval during when said analog switch is turned-on or -off.

12. A scanning type image sensor, comprising:
a first plurality of photosensitive elements each having an electric characteristic which is changeable in accordance with entering light;
a plurality of integrated circuits connected in series each of which is associated with a respective group of said first plurality of said photosensitive elements;
a plurality of analog switches included in each of said plurality of integrated circuits, each of said plurality of analog switches being connected to a corresponding one of said group of photosensitive elements associated with an integrated circuit to detect a change of an electric characteristic thereof;
means included in each of said plurality of integrated circuits for generating a drive pulse to sequentially turn the plurality of analog switches in the said integrated circuit on or off at a predetermined time interval
means for applying a relay pulse from said drive pulse generating means of one said integrated circuit to said drive pulse generating means of a succeeding integrated circuit, said relay pulse having a leading edge and a trailing edge; and
means for controlling a time width from said leading edge to said trailing edge of said relay pulse to be sufficiently shorter than said predetermined time interval.

13. A scanning type image sensor, comprising:
a photosensitive element having an electric characteristics which is changeable in accordance with entering light;
an analog switch including a first complementary FET circuit connected to said photosensitive element to detect a change of said electric characteristic as a current, said first complementary FET circuit including a first parallel connection of a first P-channel FET and a first N-channel FET having substantially the same gate capacitance;
means for producing drive pulses to be applied to said analog switch;
a first means through which a drive pulse of one polarity is applied to a gate of said first P-channel FET, said first means having a first delay time; and
a second means through which a drive pulse with reversed polarity compared to said first plurality is applied to a gate of said first N-channel FET, said second means having a second delay time substantially equal to said first delay time.

14. A scanning type image sensor, comprising:
a photosensitive element having an electric characteristic which is changeable in accordance with entering light;
an analog switch means comprising a first complementary FET circuit and connected to each said photosensitive element to detect a change of said electric characteristic as a current, said first complementary FET circuit including a first parallel connection of a first P-channel FET and a first N-channel FET having substantially the same gate capacitance;
a dummy switch having an input which is opened and an output which is connected to an output terminal of the sensor together with an output of said analog switch, and said dummy switch including a second complementary FET circuit which is operated in reverse phase with respect to said analog switch means and including a second parallel connection of said P-channel FET and a second N-channel FET having substantially the same gate capacitance;
means for producing drive pulses;
first means through which a drive pulse of one polarity is applied to a gate of said first P-channel FET of said analog switch, said first means having a first delay time;
second means through which a drive pulse of reversed polarity as compared to said one polarity is applied to a gage of said first N-channel FET of said analog switch, said second signal means having a second delay time substantially equal to said first delay time;

third means through which a said drive pulse with said reversed polarity is applied to a gate of said second P-channel FET of said dummy switch, said third means having a third delay time; and fourth means through which a said drive pulse of said one polarity is applied to a gate of said second N-channel FET of said dummy switch, said fourth signal path having a fourth delay time substantially equal to said third delay time.

* * * * *